Feb. 15, 1944. L. E. WHITTAKER 2,341,889
CONTROL APPARATUS FOR CINEMATOGRAPHIC MACHINES, ETC
Filed Aug. 21, 1942 3 Sheets-Sheet 2
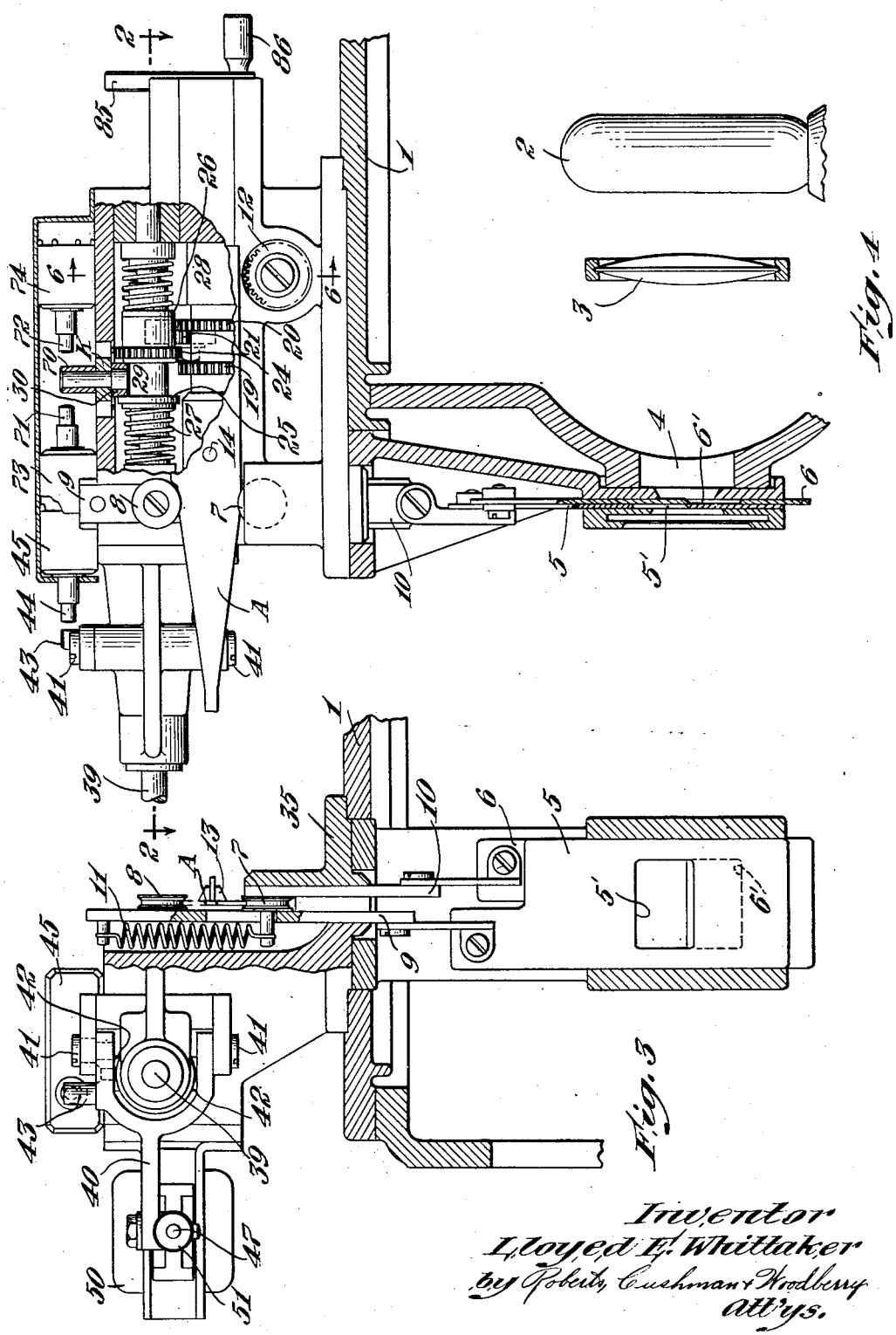
Inventor
Lloyd E. Whittaker
by Roberts, Cushman & Woodberry
att'ys.

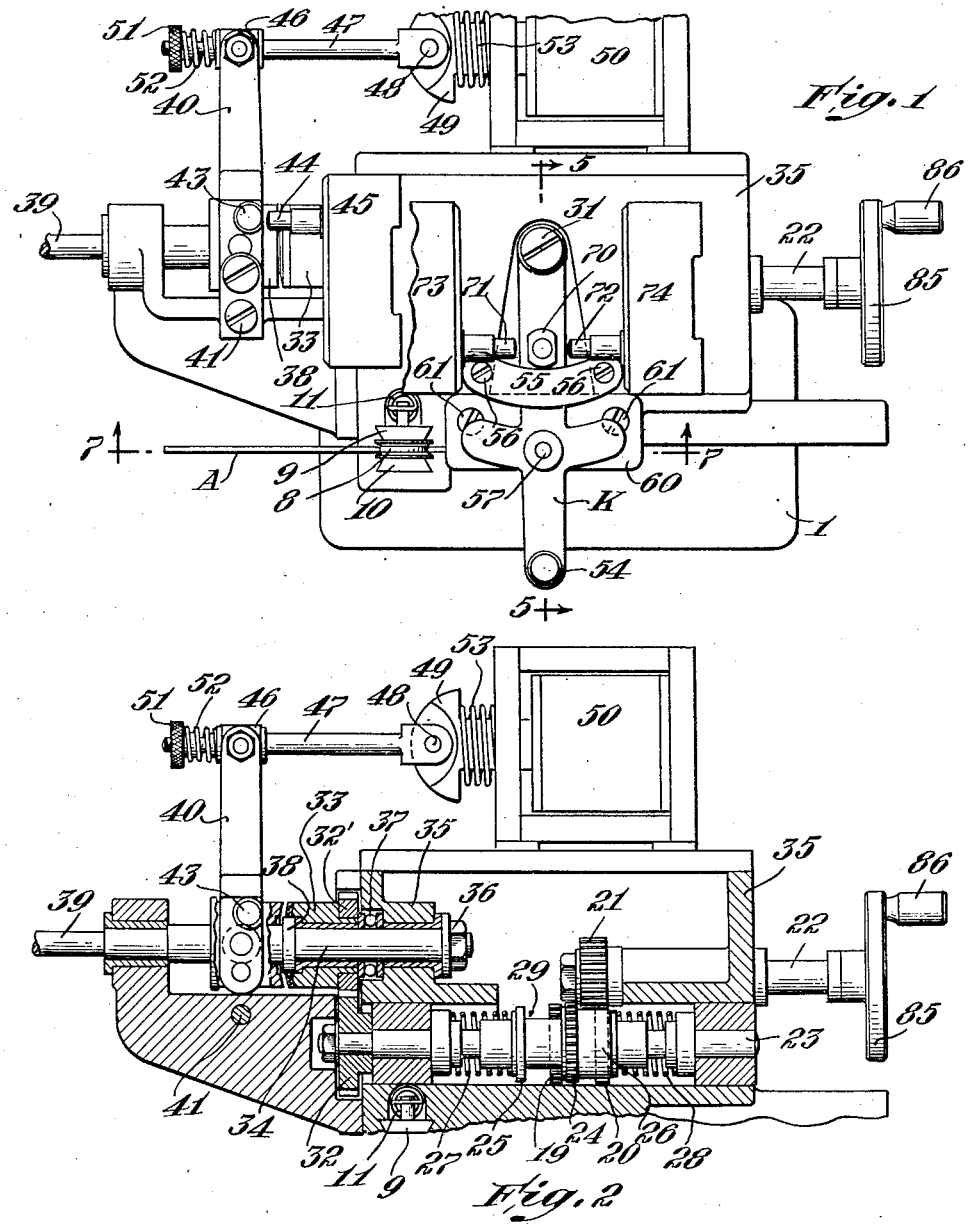

Feb. 15, 1944.　　　L. E. WHITTAKER　　　2,341,889
CONTROL APPARATUS FOR CINEMATOGRAPHIC MACHINES, ETC
Filed Aug. 21, 1942　　　3 Sheets-Sheet 3

Inventor
Lloyed E. Whittaker
by Roberts, Cushman & Woodbury
att'ys.

Patented Feb. 15, 1944

2,341,889

UNITED STATES PATENT OFFICE 2,341,889

CONTROL APPARATUS FOR CINEMATOGRAPHIC MACHINES, ETC.

Lloyed E. Whittaker, Los Angeles, Calif., assignor to Technicolor Motion Picture Corporation, Hollywood, Calif., a corporation of Maine Application August 21, 1942, Serial No. 455,593

14 Claims. (Cl. 95—75)

In the art of cinematography and elsewhere it is often desirable to move an element in different ways at different times and to control the element in such a manner that it may be pre-set for movement in some particular one of the various ways. For example in the art of cinematography it is desirable gradually to close a shutter to produce a fade-out and gradually to open the shutter to produce a fade-in. It is also desirable to pre-set the apparatus so that the movement of the shutter is started when a predetermined portion of the film passes the light aperture, as for example by means of a notch in the edge of the film.

Objects of the present invention are to provide control apparatus which is simple and economical to manufacture, which is durable and reliable in use, which can be quickly and easily regulated to produce different degrees or rates of movement, and which is generally superior to control apparatus of the types heretofore used.

In one aspect the present invention involves a cam or other actuator movable back and forth, together with means for driving the cam and a controller for the driving means, the controller having a neutral position and an operating position, the controller being held in operating position by a detent and, when released from the detent, being returned to neutral position by spring means, the apparatus also having means for releasing the detent after the actuator has moved a predetermined distance and means for stopping the actuator in response to movement of the controller to neutral position.

In another aspect of the invention the cam or other actuator is detachably mounted on a carriage so that it can be quickly and easily interchanged with other actuators for producing different kinds or rates of movement.

In a still more specific aspect the invention involves a second controller responsive to film movement, an electromagnet responsive to the two controllers for controlling the driving means, a circuit for the electromagnet, and switches associated with the controllers respectively for closing the circuit when both controllers are in operative position.

In a still more specific aspect the aforesaid driving means include two gears rotatable in opposite directions and a third gear shiftable by one of the controllers from a neutral position into mesh with either of the first two gears, together with spring means for returning both the controller and the third gear to their neutral positions when one of the aforesaid detents is released.

For the purpose of illustration a typical embodiment of the invention is illustrated in the accompanying drawings in which Fig. 1 is a top plan view;

Fig. 2 is a section on line 2—2 of Fig. 4;

Fig. 3 is a left-end view with parts shown in section;

Fig. 4 is a front view with parts shown in section;

Figure 5:
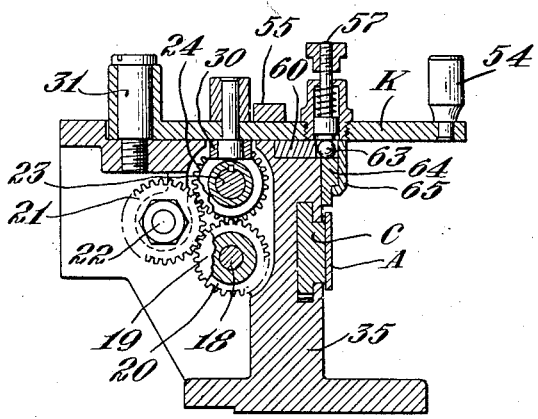
Fig. 5 is a section on line 5—5 of Fig. 1.

The particular embodiment of the invention chosen for the purpose of illustration comprises cinematographic printing apparatus of the type shown in the patent to G. F. Rackett, No. 2,271,572, granted February 3, 1942. This apparatus comprises a lamp housing 1 containing a light source 2 and a lens 3 corresponding to the parts 23, 66 and 67 of the aforesaid patent. For controlling the amount of light passing from the light source 2 through the aperture 4, two shutters 5 and 6 are arranged to slide vertically in a slot in the lamp housing, the shutters having openings 5' and 6'. When the shutter 5 is raised and the shutter 6 lowered, as in Figs. 3 and 4, the aperture 4 is entirely closed. By gradually lowering the shutter 5 and raising the shutter 6 until the two openings 5' and 6' register with each other, the light passing through the aperture 4 may be gradually increased from zero to maximum and by reversing the movement the light passing through the aperture may be gradually reduced from a maximum to zero.

Figure 7:
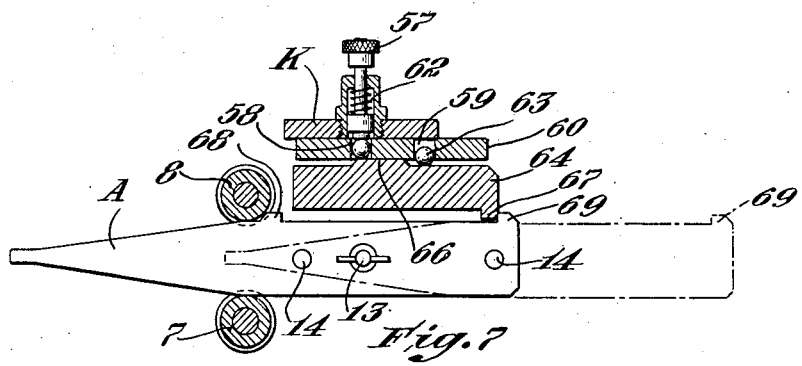
Fig. 7 is a section on line 7—7 of Fig. 1.

The actuator for gradually opening and closing the shutters comprises a wedge-shaped cam A movable back and forth between the advanced full-line position shown in Figs. 1, 4 and 7 and the retracted broken-line position shown in Fig. 7. Engaging the inclined edges of the actuator A are two rollers 7 and 8 connected to the shutters 5 and 6 through slides 9 and 10, the rollers being yieldingly held against the edges of the actuator by a spring 11 having its opposite ends connected to the slides 9 and 10 (Fig. 3). Thus as the actuator A moves to the right, the aperture is gradually opened and as the actuator moves to the left the aperture is gradually closed.

Figure 6:
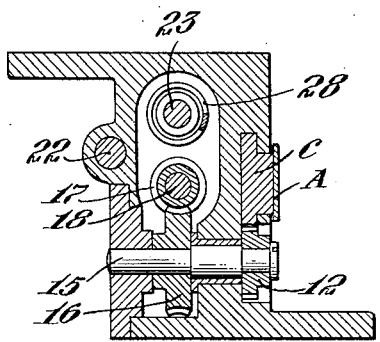
Fig. 6 is a section on line 6—6 of Fig. 4.

The means for moving the actuator back and forth comprises a carriage C in the form of a dove-tail slide having a rack along its lower edge meshing with the gear wheel 12 (Figs. 4, 5 and 6). The outer face of the carriage is exposed at the front of the machine and the actuator is mounted on the exposed face by means of a thumb nut threaded on a pin 13 projecting forwardly from the carriage, angular movement of the actuator about the pin 13 being prevented by dowel pins 14 projecting from the carriage into openings in the actuator. Thus the actuator may be quickly and easily interchanged with other actuators having different shapes, whereby the rate or degree of movement produced by the actuator may be readily changed.

The mechanism for driving the rack gear 12 comprises a shaft 15 carrying a worm wheel 16 meshing with a worm 17 on the shaft 18. As shown in Figs. 2, 4 and 5 the shaft 18 carries two gears 19 and 20 somewhat spaced apart. Always meshing with the gear 20 is a gear 21 fast to the shaft 22, the gear 21 being wider than the gear 20 and being offset in the direction of the gear 19 (Figs. 2 and 4). Disposed directly above and parallel to the shaft 18 is another shaft 23 upon which a gear 24 is splined to slide into mesh either with the gear 19 on shaft 18 or with the gear 21 on shaft 22 which is always in mesh with the gear 20 on shaft 18. Fast to the gear 24 are collars 25 and 26 against which springs 27 and 28 abut, normally to hold the gear 24 in the central neutral position shown in Figs. 2 and 4 where it meshes with neither of the two gears 19 and 21. Disposed between the gear 24 and the collar 25 is a groove 29 to receive a roller 30 for shifting the gear 24 into mesh either with the gear 19 or with the gear 21, the roller 30 being rotatably mounted on the controller K which is pivoted to the frame of the machine at 31.

The mechanism for driving the shaft 23 comprises a gear 32 fast to the left end of the shaft (Fig. 2). Meshing with gear 32 is a gear 32' fast to a clutch element 33 which is rotatably mounted on the extension 34 of shaft 39. A nut 36 is threaded on the end of extension 34 to hold clutch element 33 between thrust bearing 37 and collar 38. As shown in Figs. 1 and 2 the left end of the clutch element 33 has frictional engagement with the right end of a clutch element 38 which is splined to the drive shaft 39. The clutch element 38 is thrown into engagement with the clutch element 33 by means of an arm 40 pivoted to the frame at 41, the front end of the arm being bifurcated and carrying rollers 42 which ride in a groove in the periphery of the clutch element 38. Projecting from one side of the arm 40 is a pin 43 for engagement with the plunger 44 of a switch 45 mounted on the frame. When the arm 40 is swung to the right (Figs. 1 and 2) to engage the clutch element 38 with the clutch element 33, the pin 43 presses the plunger 44 to the right to close the switch 45. Pivotally mounted on the rear end of the arm 40 is a sleeve 46 through which slides a rod 47. The right end of the rod 47 is pivoted at 48 to the plunger 49 of an electromagnet 50, a compression spring 53 being interposed between the frame of the electromagnet and the head of the plunger. Threaded on the left end of rod 47 is a nut 51 and interposed between this nut and the sleeve 46 is another compression spring 52. When the electromagnet is energized the plunger is pulled to the right, compressing spring 53. As the plunger 49 moves to the right the arm 40 swings to the right until the clutch elements are engaged, whereupon the spring 52 is further compressed to accommodate any further movement of the plunger 49.

The controller K is mounted in a recess in the housing (Figs. 1 and 4) and has a handle 54 for swinging it from its central neutral position shown in Fig. 1 to either right or left operative positions. Bridging the recess is a retaining strap 55 which is mounted on the frame by screws 56 (Figs. 1 and 5). The controller is held in operative position by means of a plunger 57, the lower end of which is shaped to fit in either one of the two openings 58 and 59 in a plate 60 (Figs. 5 and 7) secured in a recess in the top of the casing 35 by means of screws 61 (Fig. 1), a compression spring 62 being provided to seat the lower end of the plunger in one of the openings when the controller is swung about the pivot 31 to the left or right operative position. Disposed in each of the openings 58 and 59 is a ball 63 for lifting the plunger 57 out of the opening. The balls 63 are actuated by a trip 64 which slides back and forth between the frame 35 and a plate 65 mounted on the front of the frame. Projecting upwardly from the upper edge of the trip is a cam 66 whose length is substantially equal to the distance between the balls 63, the ends of the projection 66 being inclined to cam the balls 63 upwardly. Thus when the trip cam is in its central position both balls may drop to their lower position; when the trip cam is in the left position shown in Fig. 7, the left ball is raised to disengage the detent from the left opening 58; and when the trip cam is in the right position the right ball is raised to disengage the detent from the right opening. Projecting downwardly from the right end of the trip cam is a lug 67 engageable with the shoulders 68 and 69 on the actuator A so that the trip cam is moved to the left when the actuator reaches the left position shown in full lines in Fig. 7 and to the right when the actuator is shifted to the right position shown in broken lines.

Projecting upwardly from the controller K is a lug 70 for engagement with the plungers 71 and 72 of two switches 73 and 74, each of these switches being of the type which closes when its plunger is pressed inwardly.

The circuit for the electromagnet 50 comprises two main conductors 75 and 76 and branch conductors 77, 78 and 79, the aforesaid switches 45, 73 and 74 being disposed in these branch circuits respectively. Disposed in the main circuit is a film-controlled switch 80 which is shown diagrammatically in Fig. 8 as being mounted on a lever pivoted at 81 and carrying on its left end a roller 82 engageable with the edge of the motion picture film 83, a spring (not shown) being provided yieldingly to urge the roller against the edge of the film. By providing a notch 84 in the edge of the film in well-known manner, the switch 80 is closed momentarily as the notch passes the roller. If either of the switches 73 and 74 is closed, the momentary closing of switch 80 causes the electromagnet 50 to be energized over the main circuit 75—76 and one of the branches 78 and 79. Energization of the magnet 50 closes the switch 45 which serves as a locking switch to keep the circuit of the magnet closed after the switch 80 opens. Thus the electromagnet remains energized until the controller K returns to the neutral position shown in Fig. 8 in which both of the switches 73 and 74 are open, whereupon the magnet is deenergized and the switch 45 is opened.

In order to set the position of the actuator A by hand, shaft 22 is provided with a flywheel 85 to which is attached a handle 86. Inasmuch as the gear 21 on shaft 22 is always in mesh with the gear 20 on shaft 18, rotation of the shaft 22 will actuate the rack on the carriage C through the medium of the worm 17 on the shaft 18, worm wheel 16 on shaft 15 and pinion 12 on shaft 15 which meshes with the rack.

Figure 8:
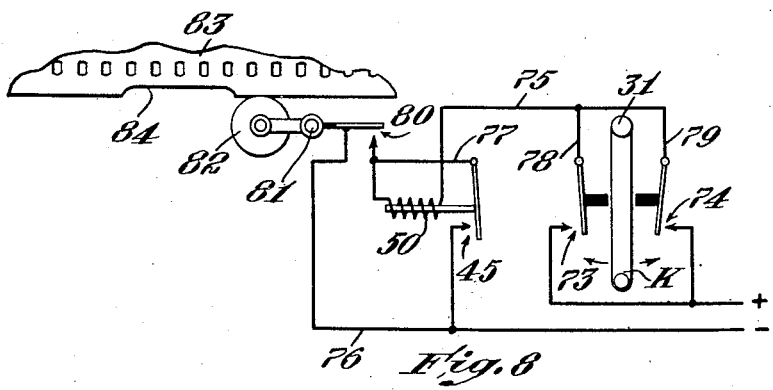
Fig. 8 is a diagram of the circuit arrangement.

To produce a fade-in the actuator is set by hand to the left-hand position shown in the drawings (see Figs. 3, 4 and 7 particularly). Then the controller K is swung to the right until the plunger 57 drops into the opening 59. In this connection it is to be observed that with the actuator A in the left position the controller K cannot be set in the left position because the left ball is raised. With the controller K thus set in the right position the switch 74 is closed (Fig. 8). Thus when the notch 84 reaches the roller 82 the switch 80 is closed momentarily to energize the electromagnet 50, which locks itself in energized position with the switch 45. The energization of the magnet 50 also closes the clutch 33—38 which starts the rotation of the shaft 23 through the medium of the gears 32 and 32'. Inasmuch as the gear 24 on shaft 23 was thrown into mesh with gear 21 when the controller was set in the right-hand position, the carriage is driven to the right through gears 24—21—20, shaft 18, worm 17, worm wheel 16, shaft 15, pinion 12 and the rack on carriage C. As the carriage moves to the right the taper of the actuator A permits the spring 11 gradually to open the shutters 5 and 6 until the actuator reaches the broken-line position shown in Fig. 7, whereupon the shoulder 68 on the actuator engages the lug 67 on the trip cam 64 to shift the trip cam from its left position to its right position. This shift of the trip cam lifts the right ball 63 to release the controller K, whereupon it is returned to its neutral position by the spring 28. In returning to neutral position it returns the gear 24 to its neutral position where it meshes neither with the gear 19 nor with the gear 21. The return of the controller to neutral position also opens the switch 74 to deenergize the electromagnet 50, whereupon both the clutch 33—38 and the switch 45 are opened.

To produce a fade-out the actuator A is set by hand to the broken-line position shown in Fig. 7 and the controller K is moved to its left-hand position. Then when the next notch 84 passes the roller 82, the shutters 5 and 6 are gradually closed in a manner similar to that above described. When the actuator is set by hand to the right-hand position, the controller K cannot be set in the right-hand position because the right-hand ball 63 is raised.

Each apparatus preferably comprises a set of actuators of different shapes and sizes. The operative ends of the actuators which engage the rollers 7 and 8 may have different lengths and different shapes. The two edges may have different degrees of inclination, they may be straight or curved, one may be straight and the other curved, one may have a greater slope than the other, they may slope in the same or opposite directions, and if desired one may be parallel with the path of back-and-forth movement. Likewise the stops 68 and 69 on the different stops of the set may occupy different positions lengthwise of the path of movement. The shorter the distance between the two stops the shorter the stroke of the actuator and vice versa. Owing to the facile way of mounting the actuators on an exposed part of the carriage, the actuators may be interchanged easily and quickly.

It should be understood that the present disclosure is for the purpose of illustration only and that this invention includes all modifications and equivalents which fall within the scope of the appended claims.

I claim:

1. Cinematographic apparatus comprising a carriage movable back and forth in opposite directions, a cam detachably mounted on the carriage for actuating a part of the apparatus, a controller having a neutral position and two operative positions for causing the carriage to be driven in said directions respectively, a detent for holding the controller in each of said operative positions, a tripper controlled by said cam for releasing each of said detents, spring means for returning the controller to neutral position when tripped as aforesaid, a second controller responsive to film movement, and means responsive to said controllers conjointly for driving the carriage in either of said directions.

2. Cinematographic apparatus comprising a casing having a light aperture, a shutter for gradually varying the size of the aperture, a cam movable back and forth in opposite directions for actuating the shutter, a controller having a neutral position and two operative positions for causing the cam to be driven in said directions respectively, a detent for holding the controller in each of said operative positions, a tripper controlled by said cam for releasing each of said detents, spring means for returning the controller to neutral position when tripped as aforesaid, a second controller responsive to film movement, and means responsive to said controllers conjointly for driving the cam in either of said directions.

3. Cinematographic apparatus comprising a casing having a light aperture, a shutter for gradually varying the size of the aperture, a carriage movable back and forth in opposite directions, a cam detachably mounted on the carriage for actuating the shutter, a controller having a neutral position and two operative positions for causing the carriage to be driven in said directions respectively, a detent for holding the controller in each of said operative positions, a tripper controlled by said cam for releasing each of said detents, spring means for returning the controller to neutral position when tripped as aforesaid, a second controller responsive to film movement, and means responsive to said controllers conjointly for driving the carriage in either of said directions.

4. Cinematographic apparatus comprising a casing having a light aperture, a shutter for gradually varying the size of the aperture, a carriage movable back and forth in opposite directions, a cam detachably mounted on the carriage for actuating the shutter, a normal controller having a neutral position and two operative positions for causing the carriage to be driven in said directions respectively, a detent for holding the controller in each of said operative positions, a tripper controlled by said cam for releasing each of said detents, spring means for returning the controller to neutral position when tripped as aforesaid, a film controller movable from inoperative to operative position in response to film movement, means for driving the carriage in either of said directions, an electromagnet controlling said driving means, a circuit for the electromagnet, and switches associated with said controllers respectively for closing said circuit when both controllers are in operative position.

5. Control apparatus comprising a carriage, means for driving the carriage, a controller for said driving means, the controller having a neutral position and an operating position, a detent for holding the controller in said operative position, spring means for returning the controller to neutral position when released from the detent, an actuator detachably mounted on said carriage, means for releasing said detent after the carriage has traveled a predetermined distance, and means for stopping the carriage in response to the movement of the controller to neutral position.

6. Control apparatus comprising a carriage, means for driving the carriage, a controller for said driving means, the controller having a neutral position and an operating position, a detent for holding the controller in said operative position, spring means for returning the controller to neutral position when released from a detent, an actuator detachably mounted on said carriage, means including a stop on said actuator for releasing said detent after the carriage has traveled a predetermined distance, and means for stopping the carriage in response to the movement of the controller to neutral position.

7. Control apparatus comprising a carriage, means for driving the carriage back and forth in opposite directions, a controller for said driving means, the controller having a neutral position and two operating positions for causing the carriage to be driven in said directions respectively, a detent for holding the controller in each of said operative positions, spring means for returning the controller to neutral position when released from a detent, an actuator detachably mounted on said carriage, means for releasing each of said detents after the carriage has traveled a predetermined distance, and means for stopping the carriage in response to the movement of the controller to neutral position.

8. Control apparatus comprising a carriage, means for driving the carriage back and forth in opposite directions, a controller for said driving means, the controller having a neutral position and two operating positions for causing the carriage to be driven in said directions respectively, a detent for holding the controller in each of said operative positions, spring means for returning the controller to neutral position when released from a detent, an actuator detachably mounted on said carriage, means including stops on said actuator for releasing each of said detents after the carriage has traveled a predetermined distance, and means for stopping the carriage in response to the movement of the controller to neutral position.

9. Control apparatus comprising a carriage, means for driving the carriage, a controller for said driving means, the controller having a neutral position and an operating position, a detent for holding the controller in said operative position, spring means for returning the controller to neutral position when released from the detent, an actuator detachably mounted on said carriage, means for releasing said detent after the carriage has traveled a predetermined distance, an electomagnet controlling said driving means, a circuit for the electromagnet, and a switch associated with said controller for closing the circuit when the controller is in operative position, and means for opening said switch to stop the carriage when the controller returns to neutral position.

10. Control apparatus comprising a carriage, means for driving the carriage, a controller for said driving means, the controller having a neutral position and an operating position, a detent for holding the controller in said operative position, spring means for returning the controller to neutral position when released from a detent, an actuator detachably mounted on said carriage, means including a stop on said actuator for releasing said detent after the carriage has traveled a predetermined distance, an electromagnet controlling said driving means, a circuit for the electromagnet, and a switch associated with said controller for closing the circuit when the controller is in operative position, and means for opening said switch to stop the carriage when the controller returns to neutral position.

11. Cinematographic apparatus comprising a carriage movable back and forth in opposite directions, a cam detachably mounted on the carriage for actuating a part of the apparatus, a controller having a neutral position and two operative positions for causing the carriage to be driven in said directions respectively, a detent for holding the controller in each of said operative positions, a tripper controlled by said cam for releasing each of said detents, a second controller responsive to film movement, means responsive to said controllers conjointly for driving the carriage in either of said directions, said driving means including two gears rotatable in opposite directions and a third gear shiftable by said first controller from a neutral position into mesh with either of the first two gears, and spring means for returning said first controller and third gear to their neutral positions when one of said detents is released.

12. Cinematographic apparatus comprising a casing having a light aperture, a shutter for gradually varying the size of the aperture, a cam movable back and forth in opposite directions for actuating the shutter, a controller having a neutral position and two operative positions for causing the cam to be driven in said directions respectively, a detent for holding the controller in each of said operative positions, a tripper controlled by said cam for releasing each of said detents, a second controller responsive to film movement, means responsive to said controllers conjointly for driving the cam in either of said directions, said driving means including two gears rotatable in opposite directions and a third gear shiftable by said first controller from a neutral position into mesh with either of the first two gears, and spring means for returning said first controller and third gear to their neutral positions when one of said detents is released.

13. Cinematographic apparatus comprising a casing having a light aperture, a shutter for gradually varying the size of the aperture, a carriage movable back and forth in opposite directions, a cam detachably mounted on the carriage for actuating the shutter, a controller having a neutral position and two operative positions for causing the carriage to be driven in said directions respectively, a detent for holding the controller in each of said operative positions, a tripper controlled by said cam for releasing each of said detents, a second controller responsive to film movement, means responsive to said controllers conjointly for driving the carriage in either of said directions, said driving means including two gears rotatable in opposite directions and a third gear shiftable by said first controller from a neutral position into mesh with either of the first two gears, and spring means for returning said first controller and third gear to their neutral positions when one of said detents is released.

14. Cinematographic apparatus comprising a casing having a light aperture, a shutter for gradually varying the size of the aperture, a carriage movable back and forth in opposite directions, a cam detachably mounted on the carriage for actuating the shutter, a normal controller having a neutral position and two operative positions for causing the carriage to be driven in said directions respectively, a detent for holding the controller in each of said operative positions, a tripper controlled by said cam for releasing each of said detents, a film controller movable from inoperative to operative position in response to film movement, means for driving the carriage in either of said directions, said driving means including two gears rotatable in opposite directions and a third gear shiftable by said controller from a neutral position into mesh with either of the first two gears, and spring means for returning the controller and third gear to their neutral positions when one of said detents is released, an electromagnet controlling said driving means, a circuit for the electromagnet, and switches associated with said controllers respectively for closing said circuit when both controllers are in operative position.

LLOYED E. WHITTAKER.